United States Patent [19] [11] 3,892,031
Bisbing [45] July 1, 1975

[54] METHOD OF CAPTURING SCREW FASTENER

[75] Inventor: Robert H. Bisbing, Springfield, Pa.

[73] Assignee: Southco, Inc., Lester, Pa.

[22] Filed: Mar. 15, 1974

[21] Appl. No.: 451,466

Related U.S. Application Data

[63] Continuation of Ser. No. 241,194, April 5, 1972, abandoned.

[52] U.S. Cl. .................. 29/437; 29/505; 29/520; 85/50 R; 151/15; 151/69
[51] Int. Cl. ............................................. B23p 11/00
[58] Field of Search ............ 29/520, 522, 437, 505; 85/50 R; 151/15, 30, 37, 69

[56] References Cited
UNITED STATES PATENTS
282,348   7/1883   McTighe ....................... 151/15
2,470,927  5/1949   Hale ............................ 151/69

Primary Examiner—Charlie T. Moon
Attorney, Agent, or Firm—Paul & Paul

[57] ABSTRACT

A fastener for removable metal panels and the like includes a screw having raised threads which terminate short of the head, forming thereat an unthreaded throat. The screw is held captive in the removable panel by a retaining washer which has a helical opening having a pitch corresponding to that of the raised threads of the screw. The washer is threaded over the threads on to the non-threaded throat portion where it is flattened, as by an annular punch, so that it cannot re-enter the threaded portion. The annulus of the washer has a helical outside diameter, as well as a helical inside diameter, to facilitate its flattening by the punch.

10 Claims, 7 Drawing Figures

3,892,031

METHOD OF CAPTURING SCREW FASTENER

This is a continuation of application Ser. No. 241,194, filed Apr. 5, 1972, now abandonded.

BACKGROUND OF THE INVENTION

This invention relates to fasteners for joining together metal parts, and particularly to an improved retaining washer in a fastener assembly intended for use with removable panels, such as covers, doors, lids and the like, where it is desirable that the fastening screw be retained in a hole in the removable metal panel so that it does not become lost when the panel is removed, as by dropping down into some inaccessible area.

The present invention relates particularly to fastening assemblies of the general type shown in U.S. Pat. No. 2,470,927 issued to W. C. Hale, Jr., on May 24, 1949, and now expired. In the Hale patent, the retaining washer is so formed that its opening has a helical thread, but such helical thread is only adjacent to the inside diameter of the washer; the helix does not extend to the outside diameter of the washer. Thus, when the prior art Hale washer is threaded over the screw threads and on to the non-threaded throat portion of the screw, the helical portion of the washer is located behind the last thread in such a position as to make it difficult to flatten the washer with the punch. To flatten the Hale washer, it has been necessary to press upon the edge of the washer opposite to the slit so as to hold the washer outwardly from the screw throat while the punch is being positioned against it. Also, when the hole in the panel has a large clearance relative to the screw, the "down leg" of the helical part of the Hale washer tends to slip into the hole, and, as a consequence, the prior art washer cannot be flattened unless great care is exercised to keep the helical area of the washer out of the clearance hole and against the panel surface.

SUMMARY OF THE INVENTION

A primary object of the present invention is to provide fastening means of the general type shown in the Hale U.S. Pat. No. 2,470,927 but having an improved retaining washer which may be more easily flattened by a punch tool.

The foregoing object is achieved, in accordance with the present invention, by providing a retaining washer having a helix formed at the outside diameter of the washer as well as at the inside diameter. Because the helical opening in the improved washer is bent up from the whole width of the washer annulus, all the way from the inside diameter to the outside diameter, it is very much easier to flatten the washer to make it captive on the screw throat. When the improved washer of the present invention is used, it is no longer necessary to pre-position the washer, to one side of center, as was the case with the prior art Hale washer. The annular punch tool, by contacting the helical outside diameter of the washer, is able to flatten the washer throughout the complete width of the annulus.

BRIEF DESCRIPTION OF THE DRAWINGS

FIG. 4 shows the washer before it is flattened by the punch.
FIG. 5 shows the washer after it has been flattened.

DETAILED DESCRIPTION OF THE PREFERRED EMBODIMENT

Figure 1:
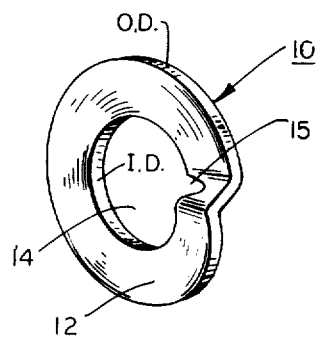
FIG. 1 is a perspective view of the improved retaining washer, according to the present invention.
Figure 2:
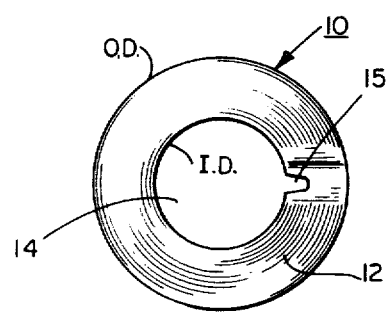
FIG. 2 is a plan view of the washer of FIG. 1.
Figure 3:
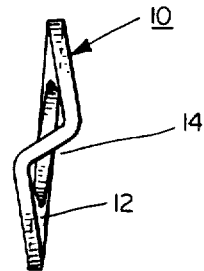
FIG. 3 is an end view of the washer of FIG. 1.

FIGS. 1, 2 and 3 are three views of the improved washer of the present invention. As there illustrated, washer 10 comprises an annulus 12 having an inside dimension (I.D.) and an outside dimension (O.D.). Washer 10 has a helical opening 14. A notch 15 is provided at the I.D. of the annulus 12 to provide an interruption or opening in the helical inner surface so that the threads of screw 20 can be engaged with the washer. As clearly illustrated in FIG. 3, the helix extends all the way from the I.D. to the O.D. of the annulus 12. The pitch of the helix corresponds to that of the raised threads of a screw 20 onto which the washer 10 is to be retained. Screw 20 is illustrated in FIGS. 4 and 5.

Figure 4:
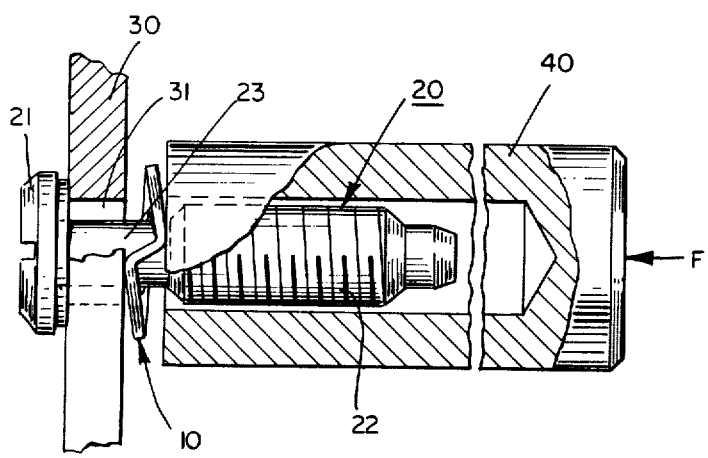
FIGS. 4 and 5 are illustrations showing how the improved retaining washer, after it has been turned over the raised threaded portion of the screw onto the unthreaded throat portion, is flattened by the annular punch.
Figure 5:
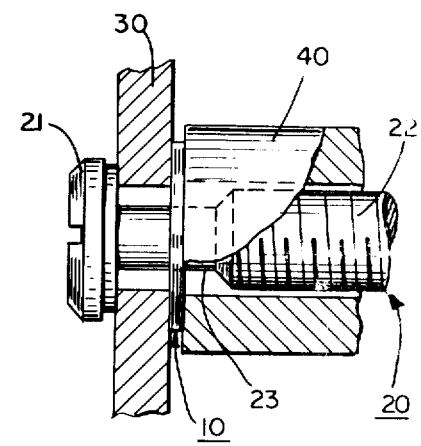

Referring now to FIGS. 4 and 5, screw 20 is there shown as having an enlarged slotted head 21 the diameter of which is larger than that of hole 31 of metal panel 30 in which the screw 20 is to be held captive. So far as the present invention is concerned, the head 21 could be of some other shape and could, for example, be a wing or other type head instead of a slotted head. Screw 20 has a threaded portion 22, the threads of which are raised beyond the basic diameter of the shank. Between the threaded portion 22 and the head 21 is a throat portion 23 having a diameter preferably equal to that at the root of the threads, i.e., equal to the minor diameter at the threaded portion 22.

After the screw 20 is inserted into the hole 31, the helical washer 10 of FIGS. 1, 2 and 3 is threaded freely over the threads of portion 22 and onto the unthreaded throat portion 23. The I.D. of washer 10 corresponds to the diameter of the throat portion 23 of the screw. Since the I.D. of the washer is smaller than the major diameter of the threaded portion 22 of screw 20, the washer 10, so long as it remains in its helical shape, is not removable from screw 20 by a mere force in the axial direction of the shank. It is, of course, removable by counter-rotating the helical washer 10 on the threaded portion 22.

In FIG. 4, a hollow cylindrical punch tool 40 is shown in its position just before a force F is applied to the punch in the direction indicated by the arrow F. When the necessary force is applied, the helical washer 10 becomes flattened. This is illustrated in FIG. 5. In its flattened condition, the washer 10 cannot enter the threads of the portion 22. Thus, the washer is captive on the throat 23 of the screw and is not removable by either axial or torsional forces.

Figure 6:
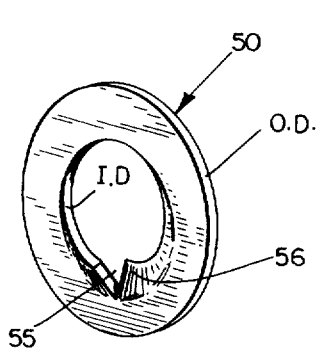
FIG. 6 is a perspective view of a prior art washer.

It is to be noted that when the force of the cylindrical punch tool 40 is applied against the outer annular portion of the helical washer 10, the entire annulus becomes flattened. This is in contrast to that which occurs with the prior-art washer of the type shown in the aforesaid Hale patent. Such a prior-art washer 50 is illustrated in FIG. 6 of the present application. As there shown, the inside diameter only of the prior-art washer is helical, and most of this helix is adjacent to the slit 55 which is provided to allow for opposite bending adjacent thereto. The outside diameter of the prior-art washer 50 is in one plane even before it is flattened.

Figure 7:
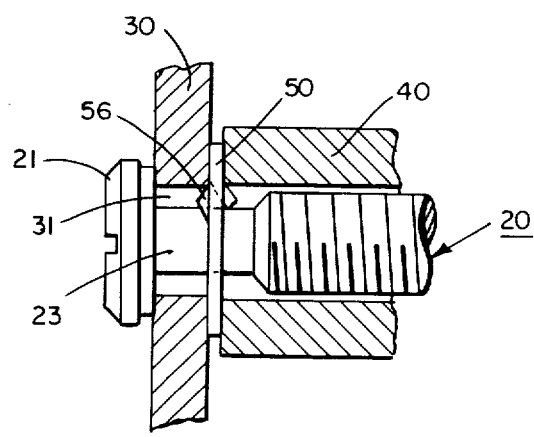
FIG. 7 is a fragmentary view, in section, illustrating the difficulty in flattening the prior-art washer of FIG. 6 by means of the punch tool.

FIG. 7 of the present application illustrates the situation when a cylindrical punch 40 is pressed against the outer annular portion of the prior art washer 50 and force applied. Such a force is ineffective to flatten the prior art washer 50 unless the washer is pre-positioned by pushing it off center by exerting a lateral force against the washer at the side opposite to the slit 55. Only in such an off-center position is it possible for punch 40 to flatten the helix adjacent the inside diameter of the prior art washer 50.

FIG. 7 also illustrates the difficulty which is had with the prior art washer when the hole 31 in the metal panel 30 is large relative to the throat portion 23 of the screw. Here again, it is necessary to apply a lateral force to the prior art washer 50 at the side opposite the slit 55 so as to push the washer to one side so that the helical portion may be flattened against the panel 30 by the cylindrical punch 40. If the "down leg" 56 of the helical washer 50 gets into the hole 31 of the panel, as is illustrated in FIG. 7, the prior art washer 50 will not flatten properly.

It will be seen that the present invention provides an improved retaining washer which is more readily pressed into flattened captive condition so that it cannot re-enter the screw threads and become separated from the screw. With the washer in flattened condition, the captive screw is nevertheless free to be moved into alignment or registry with the nut on the other member. The nut, which is usually on the stationary member, is usually formed of spring tongues struck from the stationary member and formed to conform to the helical threads of the screw.

What is claimed is:

1. A method of removably securing a panel or the like to another member by means of a fastener assembly which includes:
    A. A screw having a shank and an enlarged head;
        a. said diameters; having a raised threaded portion having major and minor diameterse;
        b. a non-threaded throat portion between said head and said threaded portion, said throat portion having a diameter not larger than the minor diameter of said threaded portion;
    B. A closed annular washer for retaining said screw captive in said panel, said retaining washer being of readily deformable material and having a center aperture having a diameter corresponding to the minor diameter of said threaded portion;
        a. said washer being continuous;
        b. said washer being helical at its outside diameter portion as well as at its inside diameter portion;
Said method including the steps of:
    C. Providing a hole in said panel;
    D. Inserting the shank of said screw through said hole, the enlarged head of said screw being larger in cross dimension than the cross dimension of said hole and not passing therethrough;
    E. Threading said helical washer over the threaded portion of said shank onto said non-threaded throat portion;
    F. Applying a force in the axial direction against the outside diameter portion only of said helical washer to flatten said entire annulus against the panel, thereby to make said washer captive on said throat portion of said screw between the panel and said threaded portion and not removable by unthreading over said threaded portion.

2. A method according to claim 1 wherein said helical washer is provided with a notch at its inside diameter portion to facilitate threading of said washer onto said threaded portion of said screw.

3. A method according to claim 1 wherein said throat portion of said screw has a diameter corresponding to that of the minor diameter of said threaded portion.

4. A method according to claim 2 wherein said throat portion of said screw has a diameter corresponding to the minor diameter of said threaded portion.

5. A method of making captive on a panel or like member a screw fastener which projects through a hole in said panel or like member, said screw fastener having a shank and an enlarged head, said shank having a raised threaded portion having major and minor diameters, said shank having a non-threaded throat portion having a diameter not larger than the minor diameter of said threaded portion, said screw fastener having thereon a closed annular washer which functions to retain said screw fastener captive in said panel, said washer being of readily deformable material and having a center aperture having a diameter corresponding to the minor diameter of said threaded portion, said washer before flattening being helical at its outside diameter portion as well as at its inside diameter portion; said method of capturing said screw fastener in said panel including the steps of:
    a. providing a hole in said panel;
    b. inserting the shank of said screw through said hole, the enlarged head of said screw being larger in cross dimension than the cross dimension of said hole and not passing therethrough;
    c. threading said unflattened helical washer over the threaded portion of said shank onto said non-threaded throat portion;
    d. applying a force in the axial direction of said screw fastener against the outside diameter portion only of said helical washer, thereby to press said outside portion against the panel, thereby to flatten the inside diameter portion as well as the outside diameter portion of the annulus of said washer, said washer after flattening being not removable by unthreading over said threaded portion of said screw fastener, whereby said washer is captive on said throat portion of said screw between the panel and said threaded portion.

6. A method according to claim 5 wherein said helical washer is provided with a notch at its inside diameter portion to facilitate threading of said washer onto said threaded portion of said screw.

7. A method according to claim 5 wherein said throat portion of said screw has a diameter corresponding to that of the minor diameter of said threaded portion.

8. A method according to claim 6 wherein said throat portion of said screw has a diameter corresponding to the minor diameter of said threaded portion.

9. A method according to claim 5 wherein the outside diameter portion only of said helical washer against which the flattening force is applied is an annular portion having a minor diameter not smaller than the major diameter of the threaded portion of the shank of said screw fastener.

10. A method according to claim 8 wherein the outside diameter portion only of said helical washer against which the flattening force is applied is an annular portion having a minor diameter not smaller than the major diameter of the threaded portion of the shank of said screw fastener.

* * * * *

UNITED STATES PATENT OFFICE
CERTIFICATE OF CORRECTION

Patent No. 3,892,031            Dated July 1, 1975

Inventor(s) Robert H. Bisbing

It is certified that error appears in the above-identified patent and that said Letters Patent are hereby corrected as shown below:

Column 3 line 45 "diameters;" should read "shank"

Column 3 line 46 "diameterse" should read "diameters"

Signed and Sealed this twenty-first Day of October 1975

[SEAL]

Attest:

RUTH C. MASON  
*Attesting Officer*

C. MARSHALL DANN  
*Commissioner of Patents and Trademarks*